United States Patent Office

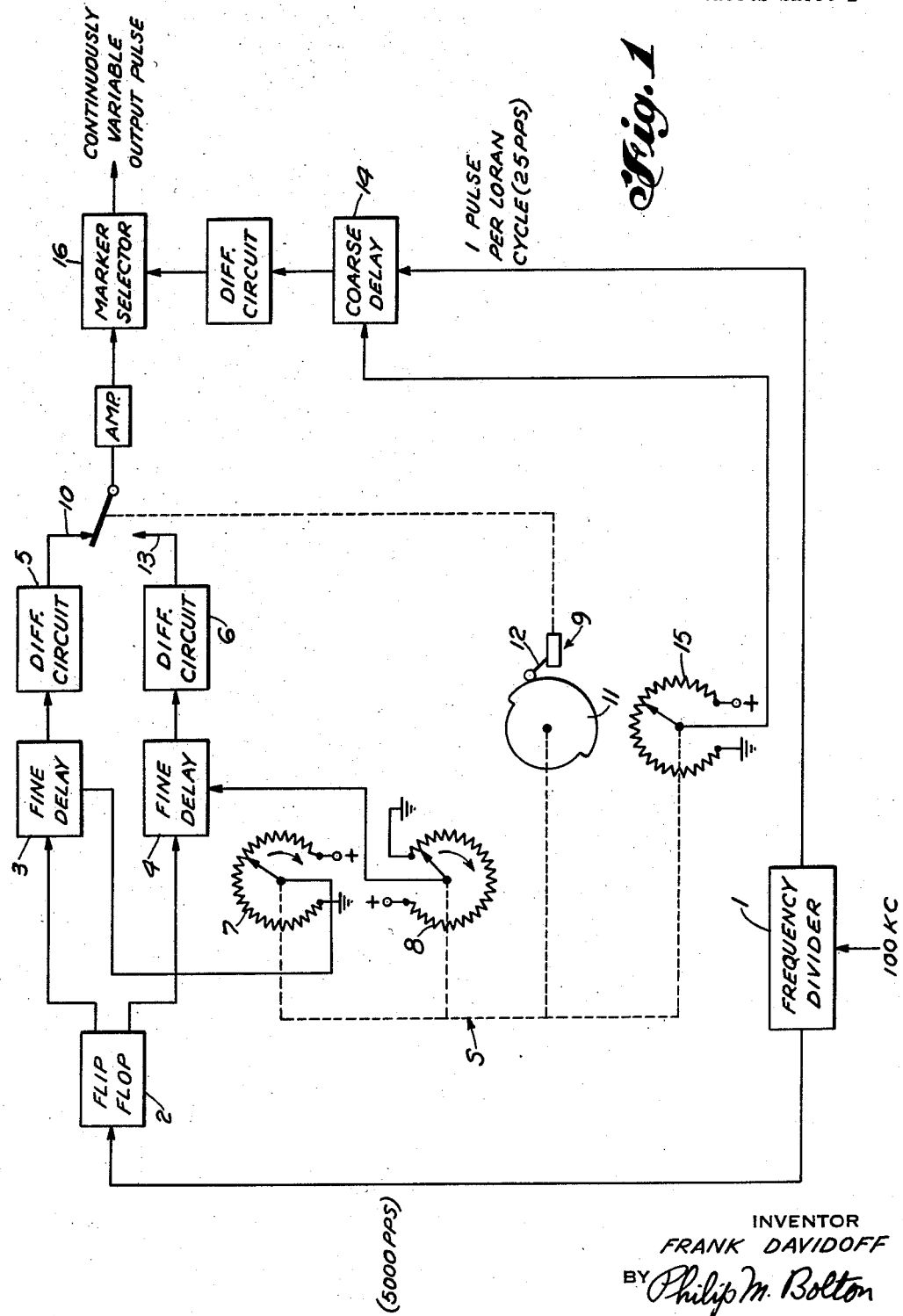

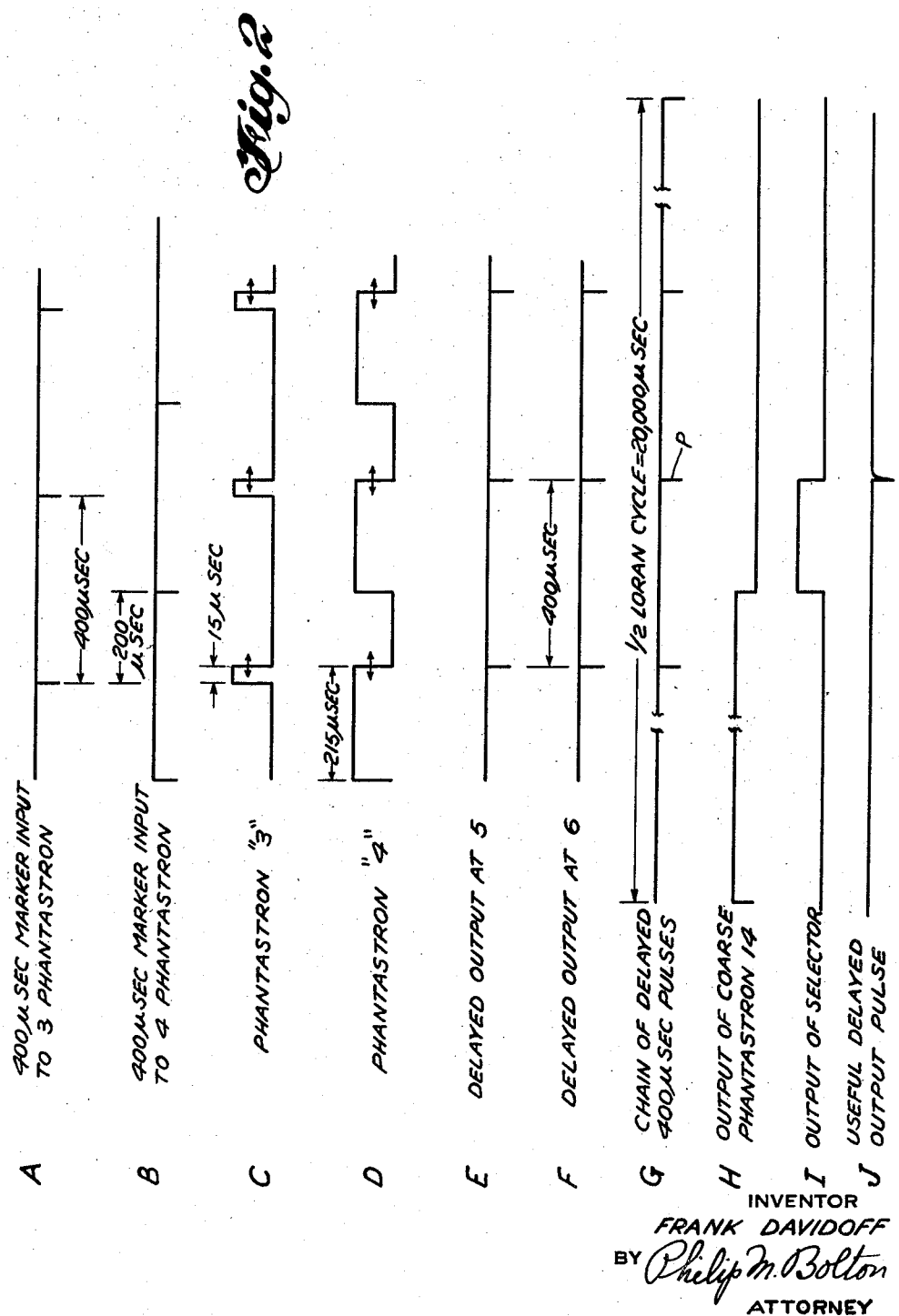

2,850,628
Patented Sept. 2, 1958

2,850,628

DELAY CIRCUIT FOR RECEIVER-INDICATOR

Frank Davidoff, Clifton, N. J., assignor to International Telephone and Telegraph Corporation, New York, N. Y., a corporation of Maryland Application October 4, 1954, Serial No. 460,149

5 Claims. (Cl. 250—27)

This invention relates to a delay circuit for a receiver-indicator and particularly to a continuously variable delay circuit.

More particularly, this invention relates to a continuously variable delay system which is controlled by a single shaft.

It is often necessary in modern communication equipment to provide continuous delay circuits for measuring time differences with a high degree of precision. This invention finds its utility in such systems. An example of such a system is the hyperbolic navigation system known as loran in which it is necessary to measure the time difference between two received pulses. Measurement of time is as large as 15,000 microseconds ($\mu$sec.) with a maximum desired accuracy of at least .5 $\mu$sec. In loran, two transmitting stations are oriented to transmit pulses at given time intervals, which pulses are received by a vessel such as an airplane, and, at the receiver the time difference between the two received pulses is analyzed from which a line of position of the craft is determined with respect to the two transmitting stations. The transmitting stations are referred to as "master" and "slave" stations respectively. The master station transmits a pulse of repetition frequency of about 25 pulses per second (P. P. S.). The slave station receives the pulse delayed by the time of propagation from one station to the other, waits one half the pulse repetition interval plus a given period of time called a "coding" delay, and then transmits its pulse. The receiving equipment located in the vessel synchronizes its timing circuits with the master pulse and accurately measures the delay between the master and slave received pulses. A detailed explanation of the loran system may be found in the book entitled "Loran," Radiation Laboratory Series 4, first edition.

The delay circuit, which is used to measure the delay between the received pulses, should be controlled by a single shaft to permit adaptation to an automatic tracking device. The conventional circuit for accomplishing this type of control is a variable phase shifting circuit. It is known that phase shifters can provide a given amount of delay for each revolution and any desired delay can be obtained by rotating the phase shifters the required number of revolutions. The output of such phase shifter is a delayed sine wave and the duration of each cycle represents the delay of one revolution. Generally, a marker signal is generated by each cycle, having the same delay as the cycle. The problem in using this output is that of selecting the desired marker signal from the chain of delayed marker signals over the entire delay range. This problem has been solved by gearing other phase shifters, operating at different frequencies, to the final phase shifter so that the output of the first phase shifter selects the output of the second one; the output of the second selector selects the output of the third, and so forth until the final phase shifter output has been selected. This type of delay device is encumbered with complex and costly gearing mechanisms. Furthermore, since the different frequency signals are in the form of pulses, expensive filters are required to convert them into sine waves.

Heretofore, a different type of delay circuit has not been used, because no other device was known which could provide a continuously variable repetitive delay. Delay circuits using wave form generators such as multivibrators or phantastrons have been considered, but deemed unsatisfactory, because in going from maximum to minimum delays, to provide a repetitive delay, the point of transition was not sharply defined. As will be more fully explained hereinafter, this invention, when used in conjunction with loran, may be characterized as a double-scale time modulation circuit. The double scale circuit utilizes a fine control circuit which produces a chain of delayed marker pulses and a coarse control circuit, which, broadly, selects a desired one of the marker pulses. In such double scale circuits, considerable difficulty has been encountered in coordinating the controls to achieve continuous delay over the entire range. For example, when the fine control is increased to a time interval exceeding that between two fixed pulses, the coarse control must be advanced to select the next pulse. This requires that the setting on the fine scale be simultaneously reduced from maximum to zero in order that approximately continuous movement of the time delay be achieved. Although mechanical devices employing cams, switches, and potentiometers covering 359½° have been constructed to accomplish this, such apparatus has not proved satisfactory.

Accordingly, it is an object of this invention to provide a delay device which is less expensive and much simpler than known continuously variable delay devices.

It is a further object of this invention to provide a delay circuit of the wave form generator type which eliminates the need for such precision equipment as mentioned above and which completely overcomes the above-mentioned difficulty.

In accordance with an aspect of this invention, there is provided a continuous delay circuit comprising a pair of normally inoperative variable time delay circuits. The delay circuits are rendered operative by applying to them, first and second trains of pulses of similar periodicity, but one train of pulses being time displaced from the other by a given amount. The maximum delay of the delay circuits is less than the repetition frequency of the pulses but greater than the time displacement between the pulse trains. The delays are controlled so that the delay of one circuit is equal to the period of time displacement at the time the other delay is initiated. The delays of both circiuts are terminated simultaneously in a region of overlap of the delays, whereby a continuous delay is achieved by successively switching from the circuit having the longer delay, to the circuit having the shorter delay.

The above-mentioned and other features and objects of this invention and the manner of attaining them will become more apparent and the invention itself will be best understood by reference to the following description of an embodiment of the invention taken in conjunction with the accompanying drawings, in which:

Fig. 1 is a schematic diagram of the continuous delay circuit forming one embodiment of the invention; and Fig. 2 is a timing diagram showing the wave forms appearing at the designated places in Fig. 1.

Referring now to Fig. 1, there is shown a continuous delay circuit for use in conjunction with a loran receiver indicator. However, as mentined above, the invention is not restricted to the loran receiver-indicator but will be described in connection therewith to facilitate an understanding of the invention. The delay circuit comprises a frequency divider 1 which may comprise two sections, for producing respective outputs at different pulse repetition frequencies. The frequencies recited in the following description are only by way of example and other frequencies may be used with equal facility. A frequency common to the lorain system is 100 kilocycles (kc.) and therefore Fig. 1 shows an input to the frequency divider of 100 kc. If desired, separate pulse producing circuits may be utilized in place of the frequency divider. The frequency divider 1 produces at one output thereof, pulses having a repetition frequency of 5000 per second (5000 P. P. S.) and spaced 200 μsec. apart for triggering flip-flop circuit 2. The flip-flop circuit 2 is a conventional circuit and, by way of example, may be an Eccles-Jordan multivibrator. The flip-flop circuit 2 produces two chains of marker pulses, the pulses of each chain being spaced apart by 400 μsec. (using the above example), but time displaced from the other chain by 200 μsec. as shown at lines A and B of Fig. 2. The outputs from the flip-flop circuit are differentiated to produce sharp pulses as indicated by the lines A and B. The differentiating circuits are not shown separately and may be considered as part of the flip-flop circuit illustrated by the block diagram. The differentiated outputs from the flip-flop circuit are applied as triggering pulses to circuits 3 and 4, respectively. The circuits 3 and 4 are monostable variable-width waveform generators. By varying the width of the output pulses of such generators, the delay of the trailing edge with respect to the leading edge of each of such pulses is controlled. By differentiating the output pulse, a delayed pulse corresponding in time to the trailing edge of the output pulse is thus obtained. A very satisfactory variable width generator is the phantastron which is a simple electronic circuit capable of producing a variable time delay, stable over relatively long periods. The operation of the phantastron is well known and a description thereof may be found in Electronics Magazine, April 1948, at pages 100–107. The most satisfactory phantastron circuit, for this invention, uses a pentode, and the output pulse width is controlled by a voltage applied to the plate circuit of the pentode. Therefore, the extent of time delay may be variably controlled by a potentiometer connected in the plate circuit of the pentode.

Thus, the output pulses from the flip-flop circuit 2 (shown at lines A and B) are applied to two identical phantastrons circuits 3 and 4, which are thereby alternately triggered. The delay range of the phantastrons is extremely linear except in the region of minimum delay. For a delay range of 200 μsec. the phantastron is best operated, from the standpoint of linearity, from a minimum of 10 μsec. to a maximum of 220 μsec. delay. The phantastrons 3 and 4 have been designated in Fig. 1 as the "fine" delay circuits, consistent with the language of the art, to indicate the marker pulse producing circuits. If the delay range of each phantastron circuit 3 and 4 is adjusted to 10 μsec. minimum and 220 μsec. maximum, and assuming triggering pulses spaced 400 μsec. apart are used, as suggested in the example, there will be an interval of 10 μsec. during which both delay circuits are producing a pulse. The constants of the two phanastrons are so chosen, with respect to the delay control potentiometers, that they will return to their inoperative state simultaneously when triggered into operation by pulses spaced in time by the chosen interval. During the interval of overlap the trailing edges of both pulses appear at the same absolute time and either circuit may be used to provide the output pulse. By way of example, the timing diagram of Fig. 2 shows at line C, phantastron 3, at a delay of 15 μsec. and at line D, phantastron 4 at a delay of 215 μsec. Since the trigger pulse shown on line B is first in time, it will trigger phantastron 4, and phantastron 4 will produce on output, until a change is caused by the timing parameters of the circuit, and 200 μsec. after phantastron 4 has been triggered, operation of phantastron 3 will be initiated by the pulse shown on line A. The maximum delay (220 μsec.) of each phantastron circuit (indicated by the trailing edge of the output pulse) is selected to be less than the period of the marker pulses (spaced apart 400 μsec.) but greater than the displacement between the two trains of pulses (200 μsec.). The pulses are differentiated by differentiating circuits 5 and 6 respectively, and the resultant pulses which correspond to the trailing edges of the output waveform from the phantastrons are indicative of the time delay. The timing diagram (Fig. 2) illustrates the differentiated pulses at lines E and F.

The delays produced by the phantastrons 3 and 4 are controlled by potentiometers 7 and 8, respectively. The two potentiometers 7 and 8 are controlled by a single shaft S and are preferably arranged so that the termination of one potentiometer winding is 180° opposite the termination of the other winding. Obviously, instead of two potentiometers, one could be satisfactorily employed having a double wiper. The delays produced by the phantastrons are directly proportional to the potentiometer voltages, and the arrangement of the potentiometers is such that while a maximum voltage is being applied to one phantastron, a suitable minimum voltage, to produce a minimum delay, is being applied to the other. Each of the potentiometers, as shown, has one terminal connected to ground and the other terminal connected to a positive source of voltage supply indicated by the symbol (+) on the drawing. It has been found that a suitable minimum voltage is developed by the potentiometer when the wiper arm thereof has travelled approximately 20° away from the ground terminal. Thus, one wiper arm would be at the maximum voltage position, or at the position which causes its associated phantastron to produce maximum delay, while the other wiper arm is at a suitable voltage position to cause its associated phantastron to produce a minimum delay.

To review one complete cycle of operation by further pursuing the example, assume that phantastron 3 is initially adjusted by the potentiometer 7 to produce a 15 μsec. delay. Accordingly, potentiometer 8 is adjusted to produce a 215 μsec. delay. As the shaft S is rotated, thus varying the voltages produced by the respective potentiometers, the delays of the phantastrons are correspondingly varied since the delays thereof are proportional to the potentiometer voltages. Referring to the Figs. 1 and 2, it is observed that the wiper arms of the potentiometers are moving in the duration of more positive voltage, as indicated by the arrow, upon rotation of the shaft. If the wiper arm of potentiometer 7 must traverse 20° of the resistor winding before the voltage developed by the potentiometer 7 is sufficient to cause phantastron 3 to produce a useful delay, then prior to attaining this position, phantastron 3 is producing no useful delay, while the delay produced by phantastron 4 is increasing. By further rotating the shaft so that the wiper arm of potentiometer 7 has travelled past 20° of the winding, a sufficient voltage will be applied to phantastron 3 to cause it to produce a useful delay, for example, 15 μsec. as shown at line C of Fig. 2. At that time, the wiper arm of potentiometer 8 will be applying almost a maximum voltage to phantastron 4 causing it to produce a delay of 215 μsec. Further rotation of the shaft will cause phantastron 4 to continuously increase its delay to its maximum, which is assumed at 220 μsec., while causing phantastron 3 to increase from 15 μsec. to 20 μsec. Continued rotation of the shaft will cause the phantastron 3 to go through a complete cycle of delay and returning to the original condition. During this time phantastron 4 will be inoperative to produce effective delay until phantastron 3 reaches about 215 μsec. delay, at which time the switch will be returned to contact 13. Thus, it is observed that both phantastrons are producing delays simultaneously over a given period and that the trailing edges of the two pulses are coincident. It is over this given period that switch-over from one delay circuit to the other is effected, whereby either trailing edge is selected and corresponds to the time delay.

During the period while the delayed pulse from phantastron 3 is utilized, cam-operated microswitch 9 is in the position indicated, making contact with the output lead 10 from differentiating circuit 5. The microswitch 9 is operated by a cam 11, mechanically coupled to the control shaft S, which actuates a cam follower 12 to operate the microswitch 9. The cam is designed to operate switch 9, to produce switch-over, at the time when both phantastrons are producing delays; and switch-over is from the phantastron producing maximum delay to the phantastron producing minimum delay. In the described example, switch-over is effected preferably at the time phantastron 3 is producing 15 μsec delay and before phantastron 4 has reached its maximum delay of 220 μsec. The delayed output from phantastron 3 is then utilized until it approaches maximum at which time switch-over to contact 13 will be initiated by the cam 11, and the output from phantastron 4, which is then near to its minimum delay, will be utilized. Thus, the two phantastron circuits provide a single, continuous repetitive delay with the only requirement being that the transition take place during the interval when both phantastron circuits are producing a delay and having time-coincident trailing edges.

The circuit controlled by the cam-operated microswitch 9 to select either one of the delay circuits may be very simple. For example, if each delay circuit output is fed to the grid of a tube and the plates of the tubes are tied together, the microswitch may be used to bias one or the other of the tubes and allow only one signal to be transmitted.

The resultant output of the delay circuits is a chain of marker pulses spaced 400 μsec. apart from each other as shown at G of Fig. 2. The entire chain can be advanced or retarded in time by rotating the control shaft S, and a fixed delay of all the pulses of the chain is obtained when the shaft is in any one given position.

While the delay of the pulse trains operating the two fine delay circuits may be of any chosen value, the choice of a delay equal to substantially one half the pulse repetition period is advantageous, as then the interval of overlap operation of the two delay circuits may be kept small.

The continuous delay system is advantageously used in the loran system by selecting a desired one of the delayed markers to measure the distance between two received pulses. The desired marker is selected by means of another phantastron 14 which corresponds to the coarse control. The phantastrons 3 and 4 correspond to the fine control of the two scale marker system; i. e. phantastrons 3 and 4 produce the marker pulses and phantastron 14 corresponds to the coarse control which is the second scale of the two scale system; i. e., phantastron 14 is instrumental in selecting a desired one of the marker pulses. Phantastron 14 is controlled by a 10 turn helical potentiometer 15, which is also geared to the shaft S but with a different gear ratio. The output of phantastron 14 is adjusted by the control voltage applied thereto from potentiometer 15 to track along with the 400 μsec. marker pulses. For a delay range of 16,000 μsec., the gear ratio for potentiometer 15 would be 4:1 so that its wiper will traverse ¼ the distance traversed by the wipers of potentiometers 7 and 8. Phantastron 14 operates similarly to phantastrons 3 and 4 in that the extent of time delay is controlled by potentiometer 15 and it is triggered into operation by a pulse. This pulse occurs once per loran cycle at the start of the slave half cycle, as shown at line H.

As mentioned above, the nominal loran repetition rate is 25 P. P. S., or 1 pulse per 40,000 μsec. The phantastron 14 always selects the same marker pulse as the entire delay range is traversed because of the common control coupled to the several potentiometers and cam. It is described above that the marker pulses, as shown at line G, may be advanced or retarded by rotation of the shaft S. Since the potentiometer 15 is coupled to the shaft, the delay produced by phantastron 14 is correspondingly advanced or retarded the same amount. Thus, if it is desired to select the marker pulse P, shown at line G, the delay of phantastron 14 is adjusted so that the marker pulse appearing after its trailing edge will be selected. If the shaft is rotated to advance the delay, it is seen that both the trailing edge of the output pulse from phantastron 14 and the marker pulse are advanced. Similarly, if the shaft is rotated in the opposite direction, both the pulse P and the trailing edge of the output from phantastron 14 are retarded; therefore, the marker pulse P is always selected during traversal of the delay range.

The selected pulse P may be passed to an indicating circuit by any suitable circuit well known to the art. For example, the selector circuit may be an Eccles-Jordan bistable multivibrator shown as a marker selector circuit 16. With this type of circuit, the output from the coarse phantastron 14 would be differentiated and the pulse corresponding to the trailing edge would be employed to trigger one side of the multivibrator. The selected marker pulse would then trigger the multivibrator to its other stable condition. The output from the multivibrator would then be a pulse having one edge corresponding to the marker pulse as shown at line I. The differentiated output is utilized in the utilization circuit.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A device for producing output pulses having a continuously adjustable delay over a predetermined time interval, comprising a pulse source for producing first and second trains of pulses each with a predetermined repitition rate, said pulse trains having a predetermined time displacement with respect to one another, first and second normally inoperative, variable delay circuits each adjustable from a minimum to a miximum delay and constructed to terminate simultaneously when rendered operative at times equal to said predetermined time displacement the maximum delay of each delay circuit being greater than said predetermined time displacement and less than said predetermined repetition rate, means for simultaneously adjusting the delays of both said delay circuits so that one circuit is near its maximum delay when the other circuit is at its minimum delay, means for applying said pulse trains to said first and second delay circuits, respectively, to render them successively operative, whereby output pulses having the same time position are produced during a period of overlap of operation of said delay circuit, an output circuit selectively connected to the outputs of said delay circuits, and means for switching the connections of said output circuit from the delay circuit having the longer delay to the delay circuit having the shorter delay during the overlap interval.

2. A device according to claim 1, wherein said delay circuits are voltage controlled their delays being proportional to the magnitude of and applied voltages, said means for adjusting said delays comprising a source of variable voltage coupled to each of said delay circuits, and means for continuously adjusting the voltages from said sources inversely with respect to one another.

3. The delay circuit according to claim 2, wherein said source of variable voltage comprises a pair of potentiometers coupled respectively to said pair of delay circuits, and said adjusting means comprising a single shaft coupled to both said potentiometers, the wiper contacts of said potentiometers being adjusted so that upon rotation of said shaft the varying voltages applied to the respective delay circuits cause one delay circuit to vary from minimum to maximum, and cause the other delay circuit to vary from maximum to minimum.

4. The circuit according to claim 3, wherein said delay circuits comprise phantastrons capable of producing variable width pulses, the width being proportional to the magnitude of control voltage applied thereto, and corresponding to the time delay, said potentiometers being adjusted so that the trailing edges of said pulses are coincident in time whereby said trailing edge serves as a time delay marker.

5. The circuit according to claim 4, and further comprising means coupled to the outputs of said phantastrons for differentiating the waveforms produced thereby and obtaining a pulse corresponding to the trailing edge of said waveform, a cam coupled to said shaft, a utility circuit, switching means controlled by said cam and coupled between the output of said differentiating means and the input of said utility circuit, said cam being adjusted to actuate said switch so that the delay circuit varying from minimum to maximum is successively coupled to said utility circuit.

References Cited in the file of this patent

UNITED STATES PATENTS

| | | |
|---|---|---|
| 2,466,044 | Schoenfeld | Apr. 5, 1949 |
| 2,534,872 | Meacham | Dec. 19, 1950 |
| 2,560,600 | Schafer | July 17, 1951 |
| 2,614,218 | Hancock | Oct. 14, 1952 |
| 2,660,672 | Urtel | Nov. 24, 1953 |
| 2,665,410 | Burbeck | Jan. 5, 1954 |
| 2,685,027 | Alvarez | July 27, 1954 |
| 2,697,797 | Holmes | Dec. 21, 1954 |
| 2,710,914 | Okrent | June 14, 1955 |
| 2,716,236 | Reinish et al. | Aug. 23, 1955 |